United States Patent [19]

Kühner et al.

[11] 4,381,949

[45] May 3, 1983

[54] RESORCINOL-FILLER PREPARATION, PROCESS FOR THE PRODUCTION AND USE OF THE SAME

[75] Inventors: Gerhard Kühner, Hanau; Siegfried Wolff, Bornheim-Merten; Lothar Rothbühr, Hürth-Hermülheim, all of Fed. Rep. of Germany

[73] Assignee: Degussa Aktiengesellschaft, Frankfurt, Fed. Rep. of Germany

[21] Appl. No.: 231,475

[22] Filed: Feb. 3, 1981

[30] Foreign Application Priority Data

Feb. 4, 1980 [DE] Fed. Rep. of Germany ....... 3003934

[51] Int. Cl.³ .............................................. C09C 1/44
[52] U.S. Cl. ................................................... 106/307
[58] Field of Search ........................................ 106/307

[56] References Cited

U.S. PATENT DOCUMENTS 3,687,719 8/1972 Klötzer et al. ............... 117/132 BF
3,778,406 12/1973 Klötzer et al. ................ 260/41.5 A Primary Examiner—James Poer
Attorney, Agent, or Firm—Cushman, Darby & Cushman

[57] ABSTRACT

There is prepared a homogeneous mixture of 95 to 30% carbon black and 5 to 70% resorcinol. The resorcinol preferably either has an average particle size of 0.10 to 0.4 0.40 mm or is broken down to that size. The product is employed in rubber mixture to improve the adhesion of rubber vulcanizates to metal, textile fibers, glass fibers, or their structures.

17 Claims, No Drawings

RESORCINOL-FILLER PREPARATION, PROCESS FOR THE PRODUCTION AND USE OF THE SAME

BACKGROUND OF THE INVENTION

For the improvement of the stability of vulcanized rubber articles as for example tires, conveyor belts, V-belts, hoses and the like against mechanical deformation as is known these are reinforced with plies. Such composite articles have plies or inner or outer layers of textile fibers or textile fiber structures such as fabrics and fleeces, or metal wires or metal wire structures such as, e.g. steel cord, which also can have a coating such as e.g. of brass, zinc or the like. Glass fibers or glass fiber structures also have been used already as ply materials.

The firm anchoring or adhesion of the ply materials with the rubber vulcanizate is important in order that there be attained a good service life of the dynamically required molded articles. Thus it is known to partially replace the carbon black filler in the rubber mixture by silica filler in order to produce a high adhesion (German Pat. No. 1620786 and related Klötzer U.S. Pat. No. 3,687,719). Further substantial improvement in adhesion is produced as is known by adding to the known rubber mixtures components capable of forming synthetic resins such as phenol and/or amine and aldehyde or aldehyde splitting off compounds. Resorcinol and hexamethyleneteramine find a wide use as resin forming components in rubber adhesive mixtures (British Pat. No. 801,928, French Pat. No. 1021959) in a given case in combination with silica filler (German AS No. 1078320).

Because of its poor dispersibility resorcinol is difficult to work into rubber adhesion mixtures. Therefore there are mostly used more easily dispersible mixtures of resorcinol with a silica filler (German Pat. No. 1301478 and related Klötzer U.S. Pat. No. 3,778,406) as, e.g. the commercial product Cofill ® 11 of Degussa, which is a 1:1 mixture of resorcinol and a specific silica filler. To be sure in this product the customery clumpy or scaly resorcinol is present in homogenously distributed form, but the product also shows disadvantages. Thus there can occur undesired dust development in processing.

Also the mixture reduces only slightly or not at all the tendency of resorcinol to sublimation from the rubber mixture at the customary processing temperatures as a result of which exhaustors are required for the purification of the work air. Also something is left to be desired in regard to easy dosability and flowability of the powdery product.

Therefore it was the problem of the present invention to discover a resorcinol containing preparation which is present in homogeneous distribution, has good flowability and dosability, preferably does not dust in the weighing and mixing procedure, has good dispersability in rubber mixtures and whose resorcinol portion shows a reduced sublimation, without the quality of the rubber molded article produced there-with being impaired, thus especially neither reducing the physical rubber properties, nor especially its good adhesion properties between plies and rubber.

SUMMARY OF THE INVENTION

The preparation of the invention consists essentially of resorcinol and at leat one carbon black in homogeneous distribution. Preferably the preparation is in pellet or granulate form. This preferred granulate form is produced if the resorcinol employed has an average particle size of 0.10 to 0.40 mm or is reduced to this average particle size during the process of production. Preferably there are employed as the carbon black furnace blacks having a specific particle surface area of about 40 to 120 $m^2/g$, preferably 75 to 85 $m^2/g$, an average primary particle size of 20 to 45 nm, preferably 24 to 30 nm and a dibutyl phthalate absorption of 45 to 130 ml/100 g, preferably 75 to 110 ml/g, and a preferred weight ratio of carbon black to resorcinol of 50:50. The preparation of the invention generally has a carbon black/resorcinol weight ratio between 70 to 30 and 30 to 70. The upper limit of this weight ratio is 95 to 5. The invention also includes a process for the production of the resorcinol/filler preparation. Thereby there are preferably performed two process steps, (a) first a treatment of the resorcinol which is used in the form of customary platelets or small lumps, together with the carbon black powder in a high speed mixer for several seconds and (b) subsequently, preferably in another slowly running mixer, e.g. a closed cylinder having an inner diameter of about 2 meters rotating at 10 to 20 rpm at a residence time of 1 to 5 hours, whereby the product formed takes a bead shaped configuration, if the above described condition of average particle size of the resorcinol is maintained. Or the resorcinol can be employed in molten form. The high speed mixer for the addition of liquid resorcinol has a heating apparatus, as well as in a given case, cooling apparatus and has a propeller or spike type mixer. The invention also includes the use of the preparations in rubber mixtures to improve the adhesion of rubber vulcanizates to metal, textile fibers or glass fiber or their structures.

As rubber there can be used alone or as mixtures for example natural rubber, poly cisiosprene, butadiene-stryene copolymer, butadiene acrylonitrile copolymer, butyl rubber, ethylene-propylene-polyene rubbers (e.g., ethylene-propylene-norbornadiene terpolymer), polybutadiene. The rubber mixtures can contain in particular besides the synthetic and/or natural rubber the customary mixing components such as sulfur, accelerator, filler, plasticizer (oil), antiager, antioxidant, metal oxide and the like known mixture components, aldehydes or aldehyde forming compounds which form resins with resorcinol, e.g. hexamethylene-tetramine or paraformaldehyde. The adhesive mixtures are known to improve the adhesion of vulcanization products produced therefrom to metals, textile or glass fiber or their structures or backings or plies.

While the carbon black is added in powder form for practical and economical considerations, the resorcinol, as described above, can be added in various forms. It was found that if the preparations of the invention are to be obtained in the preferred pellet or granulate form, the resorcinal must be present in an average particle size between about 0.10 and 0.40 mm or must be reduced to this particle size during the first process step which is designated (a). Particle sizes below about 0.10 mm hinder or prevent the formation of pellets or granulates. If the average particle size is above about 0.40 mm then there is not obtained uniform beads (in size and shape) or corresponding granulates.

The particle sizes were ascertained by sieve analysis and the evaluation of the sieve analysis allows the calculation of the average particle sizes (see ASTM D 1511-74). As already set forth in an advantageous form of the invention the resorcinol also can be added in liquid form, i.e. in molten condition.

The weight ratio of carbon black to resorcinol in the preparations of the invention can vary in a wide range. Thus this ratio as an upper limit is 95 to 5. For industrial use the carbon black/resorcinol weight ratio preferably is between 70 to 30 and 30 to 70. It is possible to go below the lower limit in a given case.

Unless otherwise indicated all parts and percentages are by weight. The carbon black-resorcinol preparation can consist essentially of or consist of these materials. The rubber mixtures can comprise, consist essentially of or consist of the stated materials. The process can comprise, consist essentially of or consist of the stated steps with the materials set forth.

DETAILED DESCRIPTION OF THE INVENTION

Example of Production

EXAMPLE 1

The starting products characterized as follows were employed:

|  | Carbon Black No. 1 | Carbon Black No. 2 | Carbon Black No. 3 | Silica Filler |
|---|---|---|---|---|
| Average Particle Diameter[1] in nm | 27 | 29 | 25 | 18 |
| Specific Surface Area[2] in m$^2$/g | 80 | 95 | 180 | 175 |
| DBP-number[3] in ml/100 g | 100 | 120 | 110 | 170 |
| Volatile Components[4] | 1.0 | 6.0 | 14.5 | — |
| Type of Filler | Furnace Black | Gas-Black | Gas-Black | Precipitated Silica |

[1] average value determined electron microscopically and with the help of the particle size analyzer TGZ3 of the Zeiss firm
[2] determined by the nitrogen adsorption method according to DIN66132 (German Industrial Standard 66132)
[3] dibutyl phthalate adsorpiton according to DIN53601
[4] determined according to DIN53552

3000 grams of carbon black No. 1 and 3000 grams of resorcinol were mixed in a high speed mixer at 1400 revolutions per minute (rpm) for 5 seconds. With this short time mixing process the resorcinol, which previously consisted of platelets of about 5 × 10 mm as well as lumps of similar size was changed into a homogeneous form together with the carbon black with comminution of the resorcinol. The average particle size of the resorcinol thereby reduced to 0.21 mm. This mixture was then placed in a so-called rotary pelletizing drier of cylindrical structure having a diameter of 2 meters and a length of 50 cm and was rotated therein at 12 rpm for about 90 minutes. After this time a pellet shaped preparation (Preparation I) was withdrawn from the rotary drier.

In similar manner there were produced further pellet shaped preparations, always in 1:1 mixture of carbon black with resorcinol, namely with carbon black No. 2 the Preparation No. II and with carbon black No. 3 the Preparation No. III. The most important properties of the produced Preparations I to III and for comparison the 1:1 mixture according to the state of the art (Cofill ® of Degussa) are collected below.

| Preparation No. | I | II | III | Mixture According to the State of the Art |
|---|---|---|---|---|
| Pour Density[5] in g/l | 448 | 440 | 400 | 260 |
| Bulk density[6] in g/l | 506 | 484 | 452 | 338 |

[5] measured according to DIN 53 600
[6] determined according to DIN 53 194

| Preparation No. | Sieve Analysis in Percent | | |
|---|---|---|---|
|  | I | II | III |
| Greater than 1 mm | 10.4 | 13.2 | 17.8 |
| 0.7 to 1.0 mm | 14.6 | 15.2 | 14.4 |
| 0.5 to 0.7 mm | 14.4 | 16.0 | 16.6 |
| 0.25 to 0.5 mm | 26.4 | 24.8 | 27.0 |
| 0.125 to 0.25 mm | 20.0 | 16.8 | 14.0 |
| Smaller than 0.125 mm | 14.2 | 14.0 | 10.2 |
| Average particle size (in mm) | 0.51 | 0.56 | 0.62 |
| Residue after washing out the resorcinol with hot water in weight percent | 51.4 | 50.7 | 49.3 |

The three preparations of the invention have the following advantageous properties. They represent readily flowable, dust free granulates and have a clearly higher pour density as well as bulk density. Particularly the bulk densities of the preparations of the invention important in practice are in the range of 450 to 500 g/l compared to the product of the state of the art of 338 g/l are noticeably more favorable.

To prove a further important advantage of the preparations of the invention, namely the reduction of the inclination of resorcinol in the preparations to sublimation the following experiments were carried out.

EXAMPLE 2

In each case 10 grams of the resorcinol/filler preparations according to Example 1 and for comparison of the product according to the state of the art were weighed in a flat porcelain dish and these samples heated for 24 hours at 8 different specific temperatures. After cooling of the samples they were weighed again and the loss of weight calculated in percent. Thereby there were established the following results for weight loss.

| Sublimation-temperature in °C. | Weight Loss in % For | | | Product According to the State of the Art |
|---|---|---|---|---|
|  | Preparation I | Preparation II | Preparation III |  |
| 50 | 0.23 | 0.48 | 0.79 | 1.2 |
| 60 | 0.38 | 0.94 | 1.3 | 1.8 |
| 70 | 0.47 | 1.0 | 1.5 | 1.9 |
| 80 | 0.93 | 1.6 | 2.2 | 2.8 |
| 90 | 1.3 | 2.1 | 2.6 | 3.8 |
| 100 | 2.5 | 3.6 | 4.5 | 5.3 |
| 110 | 3.3 | 4.2 | 5.0 | 7.2 |
| 150 | 16.8 | 20.2 | 16.8 | 29.4 |

The preparations of the invention clearly show more favorable values than the product of the state of the art whereby Preparation I showed the least loss in weight at all temperatures, thus coming off the most favorably.

EXAMPLE 3

In order to exclude the influence of entrained water in the testing of the inclination to sublimation there were again produced as described in Example 1 three preparations according to the invention from the same 3 types of carbon black, in which case these types of carbon black, however, were previously dried at 125° C. Likewise for comparison there was also produced a product according to the state of the art likewise previously dried in the same manner of silica-filler and resorcinol (1:1 mixture). The sublimation testing took place at 70° C. The test results again showed a clear superiority of the preparation of the invention:

| Preparation | Sublimation Lost in Weight Percent at 70° C. | | |
|---|---|---|---|
| | No. IV, 1:1 Mixture of Carbon Black No. 1 and resorcinol | No. V, 1:1 Mixture of Carbon Black No. 3 and resorcinol | State of the Art 1:1 mixture of dried silica-filler and resorcinol |
| after 24 hours | 0.32 | 0.46 | 1.04 |
| after 48 hours | 0.49 | 0.53 | 1.13 |
| after 72 hours | 0.63 | 0.67 | 1.38 |
| after 96 hours | 0.99 | 0.96 | 2.02 |
| after 168 hours | 1.46 | 1.67 | 2.37 |

EXAMPLE 4

A further variant in the production of the preparations of the invention consists of not starting from solid, platelet shaped or scaly resorcinol but first liquifying the resorcinol by heating. Thereby there is attained by experience a temperature of around 120° C. Then there were placed in a high speed mixer having a propeller type mixer at 500 rpm 480 grams of carbon black No. 1, as is described in Example 1. The heating jacket of the mixer was fed with hot water or water-vapor of about 100° C. Then there were added in the running mixer 520 grams of liquid resorcinol. As a result of the vigorous mixing process which occurred there were formed pellets whose temperature thereby was reduced to such an extent that they no longer adhered. After further cooling the final product was obtained. The following properties of this product were determined by sieve analysis and determination of bulk and pour density.

| Sieve Analysis in Percent | |
|---|---|
| Greater than 2 mm | 10.8 |
| 1.0 to 2.0 mm | 50.8 |
| 0.7 to 1.0 mm | 20.8 |
| 0.5 to 0.71 mm | 12.6 |
| 0.25 to 0.5 mm | 4.6 |
| 0.125 to 0.25 mm | 0.2 |
| Smaller than 0.125 mm | 0.2 |
| Average particle size (in mm) | 1.30 |
| Pour density (DIN 53 600) | 680 g/l |
| Bulk density (DIN 53 194) | 780 g/l |

In this way there are obtained preparations having particularly high pour densities. It was assumed therefore that these high pour densities were produced because the liquid resorcinal can penetrate into the hollow spaces formed in the carbon black and be fixed there.

The production variants of this example can also be carried out continuously, in which case there can be used with advantage for example carbon black pelleting machines such as are described for example in German Pat. No. 2147503 and related Rothbühr U.S. Pat. No. 3,852,399. The entire disclosure of the Rothbühr U.S. patent is hereby incorporated by reference and relied upon.

EXAMPLE 5

If in place of the two treatment steps in a rotary pelletizing drier as described in Example 1 there is carried out a grinding of the premixture, there is obtained an optimum distribution of the resorcinol on the carbon black surface but the grinding causes a considerable loosening of the product, which now has a very low and undesirable pour density.

In order to avoid such a disadvantage there was discovered the following production variant.

The resorcinol which was present in scales of $5 \times 10$ mm as well as in the form of lumps was ground in a disk attrition mill to an average particle size of 0.17 mm, whereby the portion of resorcinol having a particle size smaller than 0.125 mm was 33%. 3000 grams of this finely ground resorcinol was mixed with 3000 grams of carbon block No. 1 from Example 1 in a high speed mixer. The mixing time was 7 seconds (and generally should be between 5 and 10 seconds) and the number of rotations of the mixer was 1400 rpm. Having gathered this preparation from the mixing apparatus it had the following test values:
Pour density: 301 g/l
Bulk density: 375 g/l These values of the powdery preparation of the invention still exceeded the value of the mixture according to the state of the art according to Example 1.

The preparations of the invention, for their industrial advantages, find use in so-called adhesive rubber mixtures; which are rubber mixtures that in the vulcanized condition adhere especially firmly to backings and plies made of (1) textile structures such as fibers, filaments, wires, threads, fabrics, textures and the like made of textile fibers of natural or synthetic origin, (2) metal and particularly steel wires and their structures or (3) glass, particularly silicate glass and their structures. Among the mentioned fibers, filaments, wires, etc. there are particularly considered those of synthetic production made of polyesters such as e.g. polyethylene terephthalate, polyamides such as e.g. polyamide-6, polyamide-6,6 polyamide-6,10, polyamide-11 and polyamide-12 (these are also known as nylon-6, nylon-6,6 nylon-6,10, nylon-11 and nylon-12), moreover polyaramides such as, e.g. poly p- and/or m-phenylene terephthalamide or isophthalamide and regenerated cellulose (viscose). Among the metal structures there are included metal wires and particulary bare, brass-plated or zinc plated steel cords.

What good adhesive values are produced with vulcanizates of rubber mixtures which are prepared using the preparations of the invention are shown in the following examples:

EXAMPLES OF USE (A) The following four rubber mixtures were produced from the stated parts of mixture components and used for adhesive testing. The amounts are given in parts by weight. Mixture No. 4 is the comparison mixture.

| Component: | Mixture No.: | | | |
|---|---|---|---|---|
| | 1 | 2 | 3 | 4 |
| Natural Rubber[1] | 30 | 30 | 30 | 30 |
| Polyisoprene Rubber[2] | 70 | 70 | 70 | 70 |
| Stearic Acid | 1 | 1 | 1 | 1 |
| Poly-2,2,4-trimethyl-1,2-dihydroquinoline | 1 | 1 | 1 | 1 |
| Plasticizer oil, highly | | | | |

-continued

| Component: | Mixture No.: 1 | 2 | 3 | 4 |
|---|---|---|---|---|
| aromatic, Solidification point ± 0° C. | 4 | 4 | 4 | 4 |
| HAF-Black N 330[(+)] (HAF-Carbon Black N 330) | 45 | 45 | 45 | 45 |
| Granulated, active, precipitated silica-filler[(3)(+)] | 15 | 15 | 15 | 12.5 |
| Zinc Oxide | 6 | 6 | 6 | 6 |
| Lead Oxide | 2 | 2 | 2 | 2 |
| Preparation No. I of Example 1 | 5 | — | — | — |
| Preparation No. II of Example 1 | — | 5 | — | — |
| Preparation No. III of Example 1 | — | — | 5 | — |
| Mixture according to the state of the art (see Example 1)[(+)] | — | — | — | 5 |
| Benzothiazyl-2-dicyclohexyl-sulfenamide | 0.7 | 0.7 | 0.7 | 0.7 |
| Hexamethylenetetramine having 3% $SiO_2$-content[(+)] | 1.5 | 1.5 | 1.5 | 1.5 |
| Sulfur, insoluble | 4 | 4 | 4 | 4 |

[(+)]Manufacturer: Degussa A.G., Postfach 2644 D 6000 Frankfurt/Main 1. Germany
[(1)]Ribbed smoked sheets No. 1; 60 Mooney L4 (100° C.); 0.2% zinc pentachlorothiophenate content
[(2)]having 98–99% cis-1,4 content
[(3)]average primary particle size 18μ; specific surface area (DIN 66132) 175m²/g (Ultrasil® VN 3 of Degussa A.G.)

The four rubber mixtures together with or on brass-plated steel cords were then vulcanized and tested in accordance with ASTM-Norm D2229-73. Thereby the following testing conditions were selected:
Construction of the brass-plated steel cords: 7×3×0.15 mm.
Length of embedding of the steel cord in the rubber: 1 cm.
Specific molding pressure: 1 kN/cm².
Vulcanization temperature: 145° C.
Vulcanization time: 100 minutes.
They were tested with a tensile testing machine according to DIN 51221 sheet 3.
Speed in pulling out the steel cord (pull out test): 100 mm/minute.
The tensile strength which was required to pull out the steel cord from the test article was measured and the average value calculated from 10 measurements.
In the following table there are recorded the ten results measured and the average value in N/cm²:

TABLE 1

| | Vulcanizate Containing | | | |
|---|---|---|---|---|
| | Preparation I | Preparation II | Preparation III | For Comparison: Mixture According to the State of the Art |
| | 390 | 360 | 340 | 340 |
| | 390 | 380 | 340 | 350 |
| | 320 | 380 | 350 | 350 |
| | 400 | 390 | 340 | 300 |
| | 400 | 390 | 320 | 370 |
| | 350 | 330 | 320 | 310 |
| | 300 | 270 | 260 | 350 |
| | 360 | 300 | 370 | 390 |
| | 360 | 330 | 300 | 390 |
| | 380 | 280 | 340 | 370 |
| Average Value | 365 | 341 | 328 | 352 |

Since the results of this adhesive test which approaches actual practice shows a significant extent of variations it can be stated that the vulcanizate made of the rubber mixtures which contain the preparations of the invention give at least as good adhesiveness as that according to the state of the art. The adhesive test with preparation I shows the best values in its trend.

(B) The following two rubber mixtures were produced from the stated parts of mixing components and used for testing adhesion to textile fabrics. The amounts are given in parts by weight. The comparison mixture is Mixture No. 6.

| Component: | Mixture No.: 5 | 6 |
|---|---|---|
| Natural Rubber[(1)] | 50 | 50 |
| Natural Rubber[(2)] | 50 | 50 |
| Stearic Acid | 3 | 3 |
| Poly-2,2,4-trimethyl-1,2-dihydroquinoline | 1 | 1 |
| Plasticizer oil, highly aromatic Solidification Point ± 0° C. | 7 | 7 |
| GPF-BLACK N 660[(+)] | 27 | 30 |
| Granulated, active, precipitated silica filler[(3)(+)] | 15 | 12 |
| Zinc Oxide | 6 | 6 |
| Preparation No. I of Example 1 | 6 | — |
| Mixture according to the State of the art (see Example 1)[(+)] | — | 6 |
| Benzothiazyl-2-cyclohexyl-sulfenamide | 1 | 1 |
| Hexamethylenetetramine having 3% $SiO_2$-content[(+)] | 1.5 | 1.5 |
| Sulfur, insoluble | 2.5 | 2.5 |

[(+)]Manufacturer: Degussa A.G., Postfach 2644 D 6000 Frankfurt/Main 1 Germany GPF = General Purpose Furnace (Black).
[(1)]Ribbed smoked sheets No. 1; 60 Mooney L4 (100° C.); 0.2% zinc pentachlorothiophenate content.
[(2)]Brown Crepe; 60 Mooney L4 (100° C.); 0.2% zinc pentachlorothiophenate.
[(3)]Average primary particle size 18μ; specific surface area (DIN 66132) 175 m²/g (Ultrasil® VN3 of Degussa A.G.)

The two rubber mixtures were than vulcanized at 145° C. for 25 minutes in a mold at a pressure of 1.4 kN/cm² in each case together with or on a fabric made of polyethylene glycol terephthalate (Trevira® EP) having a square meter weight of 550 grams, made of fibers having a thickness measured in dtex, in the warp of 1100×3 and in the weft of 940×3 and a thread count of 116 per 10 cm in the warp and 45 per 10 cm in the weft and the composite tested for adhesion (textile adhesion test according to DIN 53530). The fabric used was neither impregnated nor treated.

In each case there was measured the separting force required to remove the fabric layer made of 2.5 cm wide samples strips from the rubber. Thereby there was used the previously described tensile testing machine according to DIN 51221, Sheet 3 and there were measured in N (Newtons) the minimum and maximum values of the indicated forces in the individual phases of the separating process of the fabric from rubber, whereby the following values were obtained.

TABLE 2

| | Vulcanizate containing: | |
|---|---|---|
| | Preparation I (from Mixture 5) | For Comparison: Mixture According to the State of the Art (From Mixture 6) |
| 1. | 220 → 270 | 180 → 240 |
| 2. | 220 → 300 | 180 → 260 |

The test results show that the adhesive strengths of the fabric to rubber has favorable values and exceed those according to the state of the art.

All told it can be seen from the examples that the preparations of the invention clearly bring about a technological advance compared to the state of the art. The products of the invention are both better in flowability and dosability and in non-dusting property. The reduction of the tendency to sublimation is a further important advantage. Also in the adhesive activity and in the industrial rubber properties there are recognized at least tendencies to better test values. The preferred embodiment of the present invention (Preparation I according to Example 1) is also in this regard compared to the state of the art indicated as advantageous.

The preparations of the invention are used in adhesive rubber mixtures for the production of automobile tires of any type, especially pneumatic tires, for tire retreads, for production of conveyer belts, transportation belts, industrial hoses, as e.g. fire department hoses and compressed air tubes, additionally rubberized fabrics, containers, shoes, camping articles, boots, V-belts and other shaped industrial articles which collectively represent composite articles of rubber and the mentioned plies, backings or supports.

The entire disclosure of German priority application No. P3003934.0-43 is hereby incorporated by reference.

What is claimed is:

1. A resorcinol-filler composition consisting essentially of homogeneously distributed resorcinol and at least one carbon black, the amount of carbon black being 95 to 30% and the amount of resorcinol being 5 to 70%.

2. A composition according to claim 1 consisting of resorcinol and the carbon black.

3. A composition according to claim 1 in the form of pellets or granulates.

4. A composition according to claim 1 wherein the carbon black is a furnace black having a specific particle surface area measured by nitrogen adsorption of about 40 to 120 m$^2$/g, an average primary particle size determined electron microscopically of 20 to 45 nm and a dibutyl phthalate adsorption of 45 to 130 ml/100 grams, said composition containing 30 to 70 parts by weight of carbon black and 70 to 30 parts by weight resorcinol based on 100 total parts by weight.

5. A composition according to claim 3 wherein the carbon black is a furnace black having a specific particle surface area measured by nitrogen adsorption of about 40 to 120 m$^2$/g, an average primary particle size determined electron microscopically of 20 to 45 nm and a dibutyl phthalate adsorption of 45 to 130 ml/100 grams, said composition containing 30 to 70 parts by weight of carbon black and 70 to 30 parts by weight resorcinol based on 100 total parts by weight.

6. A composition according to claim 1 wherein the carbon black is a furnace black having a specific particle surface area measured by nitrogen adsorption of about 75 to 85 m$^2$/g, an average primary particle size determined electron microscopically of 24 to 30 nm and a dibutyl phthlate absorption of 75 to 110 ml/100 grams, said composition containing 50 parts by weight of carbon black and 50 parts by weight of resorcinol.

7. A composition according to claim 3 wherein the carbon black is a furnace black having a specific particle surface area measured by nitrogen adsorption of about 75 to 85 m$^2$/g, an average primary particle size determined electron microscopically of 24 to 30 nm and a dibutyl phthlate absorption of 75 to 110 ml/100 grams, said composition containing 50 parts by weight of carbon black and 50 parts by weight of resorcinol.

8. A process for the production of the resorcinol-filler composition of claim 1 comprising either (1) (a) mixing resorcinol in the form of platelets or similar structure and the carbon black in powder form for several seconds in a high speed mixer to break the resorcinol down to an average particle size of 0.10 to 0.40 mm and (b) working the mixture to an essentially pellet or granular structure or (2) (a) mixing resorcinol present as a powder of an average particle size of 0.10 to 0.40 mm and the carbon black in powder form for a short time of treatment in a high speed mixer and (b) working the mixture to an essentially pellet or granulate structure or (3) employing resorcinol already present as a powder of an average particle size of 0.10 to 0.40 mm and only employing step (b) and step (a) is omitted.

9. A process according to claim 8 wherein the resorcinol is broken down to an average particle size of 0.10 to 0.40 mm in step (a).

10. A process according to claim 8 wherein step (a) is employed and the resorcinol already has a particle size of 0.10 to 0.40 mm and step (a) is omitted.

11. A process for the production of the resorcinol-filler composition of claim 5 comprising either (1) (a) mixing resorcinol in the form of platelets or similar structure and the carbon black in powder form for several seconds in a high speed mixer to break the resorcinol down to an average particle size of 0.10 to 0.40 mm and (b) working the mixture to an essentially pellet or granular structure or (2) (a) mixing resorcinol present as a powder of an average particle size of 0.10 to 0.40 mm and the carbon black in powder form for a short time of treatment in a high speed mixer and (b) working the mixture to an essentially pellet or granulate structure or (3) employing resorcinol already present as a powder of an average particle size of 0.10 to 0.40 mm and only employing step (b) and step (a) is omitted.

12. A process for the production of the resorcinol-filler composition of claim 7 comprising either (1) (a) mixing resorcinol in the form of platelets or similar structure and the carbon black in powder form for several seconds in a high speed mixer to break the resorcinol down to an average particle size of 0.10 to 0.40 mm and (b) working the mixture to an essentially pellet or granular structure or (2) (a) mixing resorcinol present as a powder of an average particle size of 0.10 to 0.40 mm and the carbon black in powder form for a short time of treatment in a high speed mixer and (b) working the mixture to an essentially pellet or granulate structure or (3) employing resorcinol already present as a powder of an average particle size of 0.10 to 0.40 mm and only employing step (b) and step (a) is omitted.

13. A process according to claim 8 comprising carrying out step (b) in a closed cylindrical container having a diameter of about 2 meters, step (b) being carried out at 10 to 20 revolutions per minute and a residence time of 1 to 5 hours.

14. A process according to claim 8 comprising carrying out step (b) in the rotating drum of a dry pelleting device.

15. A process for the production of the resorcinol-filler composition of claim 1 comprising having the carbon black present in a heated high speed mixer, rapidly turning the mixer heating the resorcinol to liquify it, flowing the liquid resorcinol continuously or in portions to the rapidly turning high speed mixer containing the carbon black and continuing the mixing until pellets are formed and cooling the pellets in the mixer until they are no longer adhesive.

16. A process for the production of the resorcinol-filler composition of claim 5 comprising having the carbon black present in a heated high speed mixer, rapidly turning the mixer heating the resorcinol to liquify it, flowing the liquid resorcinol continuously or in portions to the rapidly turning high speed mixer containing the carbon black and continuing the mixing until pellets are formed and cooling the pellets in the mixer until they are no longer adhesive.

17. A process for the production of the resorcinol-filler composition of claim 7 comprising having the carbon black present in a heated high speed mixer, rapidly turning the mixer heating the resorcinol to liquify it, flowing the liquid resorcinol continuously or in portions to the rapidly turning high speed mixer containing the carbon black and continuing the mixing until pellets are formed and cooling the pellets in the mixer until they are no longer adhesive.

* * * * *